July 21, 1964
J. W. MOMBERG ETAL
SEWING MACHINE WITH BUILT-IN ELECTRIC
SPEED-RESPONSIVE REGULATING SYSTEMS
Filed Dec. 30, 1959
3,141,429
3 Sheets-Sheet 1
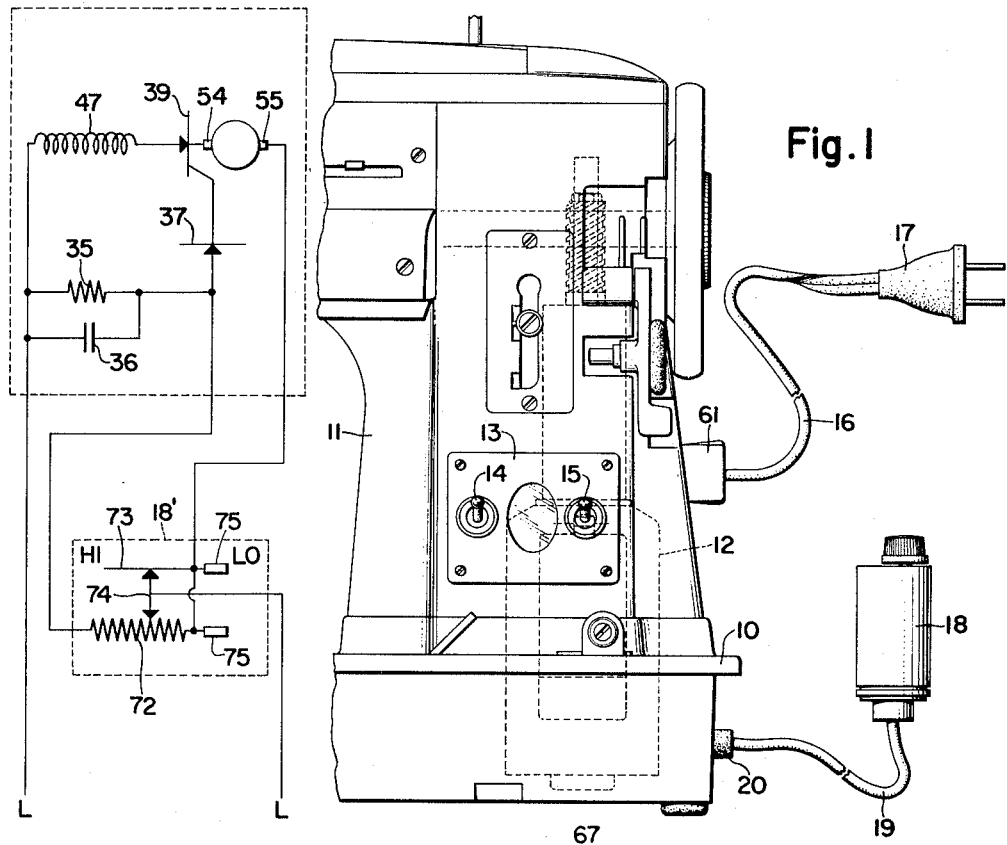
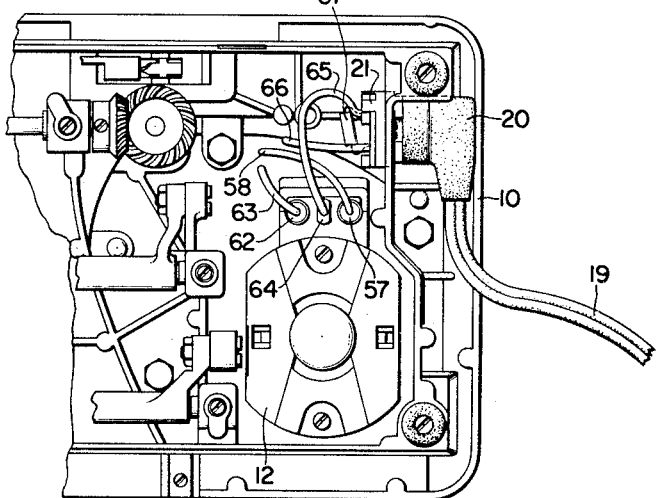
Fig. 7
Fig. 2
WITNESS
William Martino
INVENTORS
James W. Momberg
Edward W. Taylor
BY Marshall J. Breen
ATTORNEY July 21, 1964

J. W. MOMBERG ETAL 3,141,429

SEWING MACHINE WITH BUILT-IN ELECTRIC
SPEED-RESPONSIVE REGULATING SYSTEMS

Filed Dec. 30, 1959

WITNESS
William Martin

INVENTORS
James W. Momberg
Edward W. Taylor

BY Marshall J. Breen
ATTORNEY

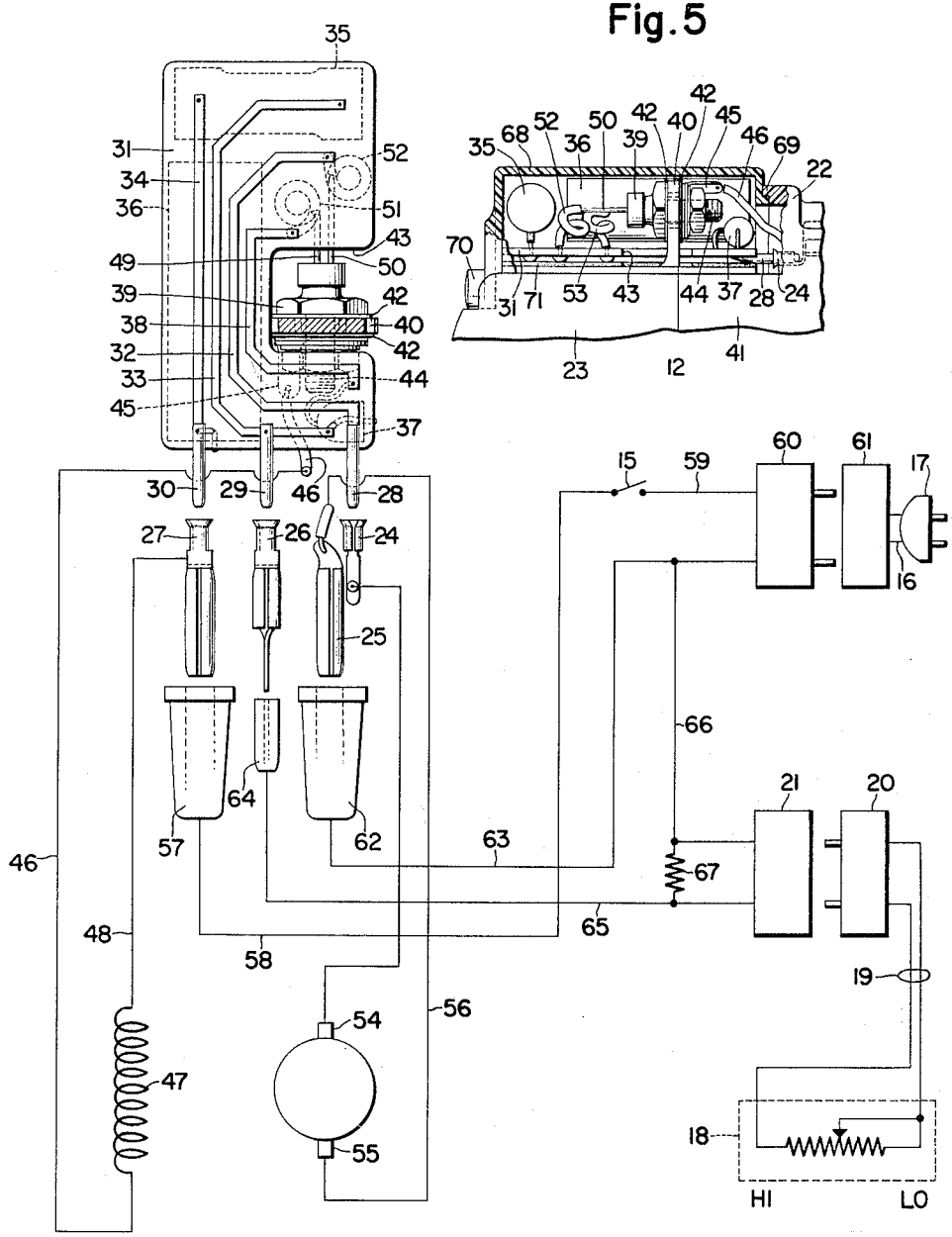

United States Patent Office
3,141,429
Patented July 21, 1964

3,141,429
SEWING MACHINE WITH BUILT-IN ELECTRIC SPEED-RESPONSIVE REGULATING SYSTEMS
James W. Momberg, Somerville, and Edward W. Taylor, Martinsville, N.J., assignors to The Singer Company, a corporation of New Jersey
Filed Dec. 30, 1959, Ser. No. 863,012
4 Claims. (Cl. 112—220)

This invention relates to electrically-driven sewing machines with built-in electric speed-responsive regulating systems, which do not depend on the mechanical making and breaking of a circuit to effect the control.

It is known to use speed-responsive contact-making governors and vibrating relays for regulating the speed of such motors to a selected value but these have, in general, been unsatisfactory for a variety of reasons among which may be mentioned slow response due to mechanical inertia and short useful life due to contact wear.

In those cases where a series resistance type controller is used for speed control, the controller itself is necessarily large and bulky because it is required to handle the full motor current without overheating.

Gaseous control rectifiers have been suggested for speed control of sewing motors, but the resulting systems have been so bulky due to heater requirements that they cannot, as a practical matter, be mounted within the frame of a sewing machine and so have not met with commercial success.

In an effort to overcome the above difficulties it is proposed according to this invention to employ an electric speed regulating circuit comprising a few simple fixed components small enough to be mounted along with the motor within the sewing machine itself. Included in these components is a solid-state controlled rectifier used as an inertialess switching device to eliminate mechanical make-and-break contacts. A resistance type controller is used to select a desired speed but, in this application, it can be made very small because it handles only the small control current for the rectifier, and not the power current for the motor.

It is a primary object of this invention to provide in combination with an electrically driven sewing machine a built-in speed responsive regulating circuit comprising a few, small electric components grouped together to form a unit preferably of smaller physical volume than the motor itself.

It is a further object of this invention to provide a sewing motor and built-in speed-responsive regulation combination which shall have improved torque characteristics, particularly at low speeds.

It is a further object of this invention to provide an electric sewing motor and an all-electric speed-responsive regulating system therefore having no mechanical contacts and which permits the use of a resistance type speed-setting controller of smaller physical dimensions than has been heretofore possible.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

In the drawings,

FIG. 1 is a partial front elevational view of a sewing machine embodying the invention.

FIG. 2 is a bottom plan view of the sewing machine of FIG. 1,

Figure 4:
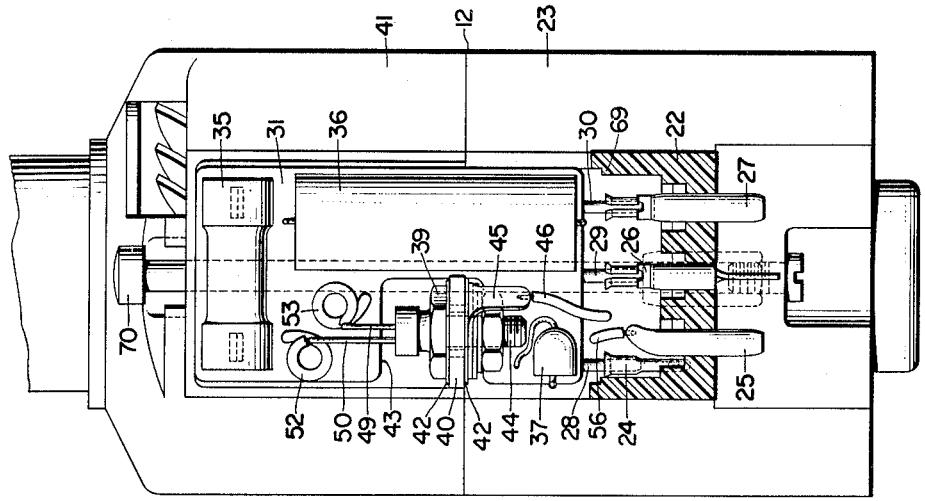
Figure 3:
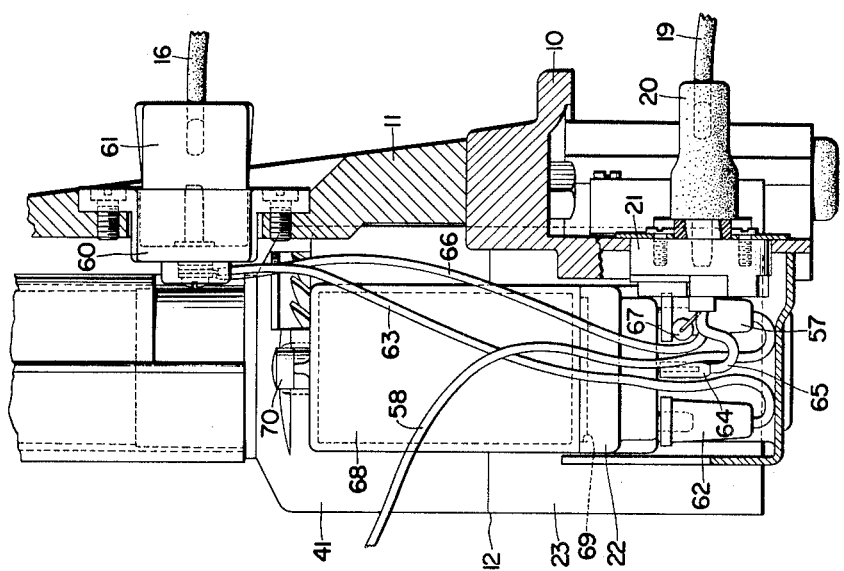

FIG. 3 is a vertical sectional view taken through the bracket arm of the sewing machine of FIG. 1 to expose the driving motor, FIG. 4 is a detailed elevation view with a portion in section, of the motor including circuit components comprising the speed-responsive regulating system embodying the invention, FIG. 5 is a vertical sectional view taken through the enclosure for the components comprising the speed-responsive regulating system, FIG. 6 is a bottom plan view of the circuit board with schematic diagram of the complete wiring arrangement, FIG. 7 is a schematic wiring diagram of a modified circuit in which the on and off switching is provided as an integral part of the controller itself.

Referring now to the drawings, the invention is disclosed as being embodied in a sewing machine having a bed 10 supporting a bracket arm 11. A driving motor 12 is positioned in the bed 10 with the rotor axis extending vertically into the bracket arm 11. The general arrangement of the parts is the same as that shown and described in the United States Patent No. 2,706,956, dated April 26, 1955, issued to W. J. Peets et al. Secured to the front of the bracket arm 11 (FIG. 1) is a plate 13 which carries two switches 14, 15. One switch 14 controls a sewing light (not shown) and the other switch 15 controls the motor 12 as will be explained presently. Connection for power supply is made through cord 16 and line plug 17. A speed-setting controller 18 is connected through a cord 19 and plug 20 to a receptacle 21 secured to the bed 10.

Referring more specifically to FIG. 4 an insulated boss 22 formed as part of a motor housing 23 supports conducting sleeves 24, 25, 26 and 27. The inner ends of the sleeves 24, 26 and 27 receive respectively conducting pins 28, 29 and 30 secured to an insulated circuit board 31. The pins 28, 29 and 30 connect with respective conducting strips 32, 33 and 34 secured to the underside of the board 31 as shown best in FIG. 6. A resistor 35, condenser 36 and a diode 37 are mounted on the upper side of said board and have leads extending through the board to connect with strips 32, 33, 34 and 38, as shown.

A silicon controlled rectifier 39 is secured to a bracket 40 formed as part of a metallic motor housing 41 and, although electrically insulated from the bracket 40 by thin mica spacers 42, the rectifier 39 is in good thermal transfer relation with the metallic housing 41 which thus serves as a heat sink. The bracket 40 extends through a notched portion 43 of the board 31. The anode terminal 44 of rectifier 39 is connected through a lug 45 to a lead 46 which goes to one end of the field winding 47 of the motor 12 (see FIG. 6). The other end of the field winding 47 is connected by lead 48 to sleeve 27. The gate terminal 49 and the cathode terminal 50 of the rectifier 39 are connected to pigtail leads 51 and 52, respectively, which are connected through the board 31 to strips 38 and 32. A lead 53 from sleeve 24 connects to armature brush 54, the other armature brush 55 being connected by lead 56 to sleeve 25.

A push-on connector 57 is engageable with sleeve 27 and connects to the switch 15 through lead 58, thence through lead 59, receptacle 60, plug 61, cord 16 and line plug 17 to one side of a conventional source of A.C. voltage. A push-on connector 62 is engageable with sleeve 25 and connects through lead 63 to the receptacle 60, thence through plug 61, cord 16 and line plug 17 to the other side of the A.C. voltage source. A push-on connection 64 is engageable with sleeve 26 and connects through lead 65 to the receptacle 21, thence through plug 20 and cord 19 to the controller 18. A lead 66 connects from lead 63 at the receptacle 60 to the receptacle 21 and a resistor 67 connects between leads 65 and 66 at the receptacle 21. The purpose of the fixed resistor 67 which shunts the controller resistance 18 is to furnish protective bias on the gate 49 of the controlled rectifiers 39 in the event that the plug 20 were removed from receptacle 21 with power-on conditions. In the absence of such bias under these conditions, the controlled rectifier 39 might be destroyed due to excess current flow.

As seen best in FIG. 5 a cover 68 for the circuit board 31 engages a lip portion 69 of the insulated boss 22 and is secured by means of a through bolt 70. An insulation strip 71 is placed between the circuit board 31 and the motor housings 23 and 41.

The arrangement described above is a physical embodiment of the circuit shown and described in United States patent application Serial No. 814,626, filed May 20, 1959, now United States Patent No. 2,939,064.

It will be noted that when the resistance of the speed-setting controller 18 is maximum corresponding to the off condition of the motor 12, voltage is still impressed on the resistor 35 and on the controller 18. The line switch 15 is provided to remove power from the motor circuit when the sewing machine is not in use to prevent undue heating of the resistor 35 and controller 18 as described.

The circuit of FIG. 6 utilizes two conductors (in cable 19) to connect the controller 18. FIG. 7 shows an alternative circuit using three conductors to connect the controller but provides on and off line switching as an integral part of the controller and so does not require the separate line switch 15. In this case a controller 18' is provided with a resistance 72, a fixed contact bar 73 and a double contact slider 74. As the slider 74 is moved in the direction of decreasing speed, it runs onto insulating strips 75—75, which position removes the voltage of lines L—L from the motor circuit. This is the "off" position of the controller and in this position no component in the motor circuit is left with voltage applied.

As an indication of the savings in the size and cost of the controller made possible by the use of this invention it is to be noted that the regular resistance foot controller heretofore used for controlling family-type sewing machines must be capable of dissipating 30 watts. The maximum power loss in the controller of this invention is approximately ½ watt. This is a ratio of 60:1 and reflects a distinct advantage in miniaturizing the control element.

The practical embodiment of the circuit of this invention employed the following components:

Resistor 35 _____ 4000 ohms—5 watts.
Capacitor 36 _____ 0.47 mfd.—400 volts.
Resistor 67 _____ 1000 ohms—1 watt.
Diode 37 _____ Sarkes Tarzian F-6.
Rectifier 39 _____ General Electric C35B silicon controlled rectifier.
Controller 18 _____ 1000 ohms—3 watt pot.

It will be perceived from the above that there has been provided by this invention a speed regulating system for a sewing machine, which system is free from the inertial and wear effects of the usual make-and-break contacts and of such compact physical dimensions as to be readily mounted on the motor itself for installation as a single unit within the bracket arm of a sewing machine. It will further be perceived that the controller used to set the motor speed, which heretofore has necessarily been a rather large and bulky device, becomes, in this invention, a small unit of very low heat dissipation suitable to be held in the hand which at the same time may be used to guide the work thus providing the ultimate in co-ordinated control.

Having thus set forth the nature of the invention what we claim herein is:

1. A sewing machine having a frame including a bed and a hollow standard rising therefrom, an electric driving motor of the series commutator type located within said frame, means for securing said motor to said frame in position to drive said sewing machine, a manually actuated controller for regulating the speed of operation of said motor, and circuit means connecting said motor and controller and having terminals adapted to be connected to an external source of electrical energy, said circuit means comprising a plurality of electrical components all of which are mechanically static and at least one of which is a solid state controlled rectifier.

2. A sewing machine having a frame including a bed and a hollow standard rising therefrom, an electric driving motor located within said frame and secured in position to drive said sewing machine, a solid-state controlled rectifier located within said frame and electrically connected to said motor to control to power current supplied thereto, a circuit module for controlling said rectifier and comprising small static electrical components interconnected in a compact assembly located within said frame, and a manually-operated speed-setting controller located externally of said frame and electrically connectible through said frame to said internal circuit module, said controller having a current capacity substantially less than said power current.

3. A sewing machine having a frame including a bed and a hollow standard rising therefrom, an electric driving motor located within said frame and secured in position to drive said sewing machine, field and armature windings for said motor, a solid-state controlled rectifier having an anode, a cathode and a gate and located within said frame, means electrically connecting said anode and cathode in series with said field and armature windings to control the power current supplied to said windings, a circuit module comprising small static electrical components interconnected in a compact assembly, means electrically connecting said module to said gate to supply control current to said gate for controlling said rectifier, and a manually-adjustable electrical component connectible to said circuit module for setting a base motor speed, said adjustable component having a current capacity substantially less than said power current.

4. A sewing machine having a frame including a bed and a hollow standard rising therefrom, an electric driving motor located within said frame and secured in position to drive said sewing machine, a solid-state controlled rectifier, circuit means connecting said rectifier to said motor to control the power current supplied thereto, means for supplying control current to said rectifier including a circuit module comprising small static electrical components and having a physical size smaller than the motor itself, and an adjustable controller element located externally of said frame and connectible to said circuit module for setting the motor speed, said controller having a current capacity substantially less than said power current.

References Cited in the file of this patent
UNITED STATES PATENTS

| | | |
|---|---|---|
| 1,962,880 | Schwab et al. | June 12, 1934 |
| 2,337,066 | Schmitt et al. | Dec. 21, 1943 |
| 2,440,308 | Storck | Apr. 27, 1948 |
| 2,458,904 | Happe | Jan. 11, 1949 |
| 2,617,375 | Peets | Nov. 11, 1952 |
| 2,706,956 | Peets et al. | Apr. 26, 1955 |
| 2,939,064 | Momberg | May 31, 1960 |
| 2,942,125 | Schaefer | June 21, 1960 |
| 2,945,174 | Hetzler | July 12, 1960 |
| 2,977,523 | Cockrell | Mar. 28, 1961 |